July 16, 1963     D. BEGGS ET AL     3,097,836

INGOT HEATING FURNACE

Original Filed June 3, 1959

INVENTORS
DONALD BEGGS
WILLIAM A. PHILLIPS
BY
Charles S. Haughey
ATTORNEY

United States Patent Office 3,097,836
Patented July 16, 1963

3,097,836
INGOT HEATING FURNACE
Donald Beggs and William A. Phillips, Toledo, Ohio, assignors to Midland-Ross Corporation, Toledo, Ohio, a corporation of Ohio
Continuation of application Ser. No. 817,901, June 3, 1959. This application May 18, 1962, Ser. No. 199,557
8 Claims. (Cl. 263—41)

This invention relates to a furnace for heating metal ingots, and particularly elongate aluminum ingots whose thermal conductivity is relatively high, to uniform temperatures.

Rapid and uniform heating to temperatures just short of eutectic melting temperatures of aluminum alloys is desirable for homogenization of aluminum ingots or billets. Such billets have high rates of heat conductivity, but may be as large as 18 inches by 54 inches by 200 inches and weigh 20,000 pounds for example. Due to variations of surface emissivity over the surface of such billets, uniform heating by radiation is very difficult to attain. Due to size and handling problems it is very difficult to radiate heat to all sides of a billet simultaneously, and it is generally impracticable to apply large heat heads in radiant heating of aluminum for fear of localized overheating. It is accordingly the purpose of this invention to apply a combination of convection and radiation heating to such billets to produce rapid and uniform heating in an economical and practicable manner. Recirculation of atmosphere axially along the elongate billets provides rapid convection heating of the billets but tends to produce a declining temperature gradient from the upstream billet end to the downstream billet end, the temperatures being unaffected by surface emissivity of the billets. Radiation of heat to the downstream ends of the billets produces an opposing temperature gradient, and the conjunction with the convection heating reduces the total radiation heat requirement. This allows lower radiation heat source temperatures, and decreases the non-uniformity due to emissivity variations, while supplying sufficient heat to pass by conduction "upstream" of the billets and correct the tendency of the convection heating to produce the noted declining temperature gradient.

For a further consideration of what we believe to be novel and our invention, attention is directed to the preferred embodiments thereof as disclosed in the following specification, drawings and claims.

Figure 1:
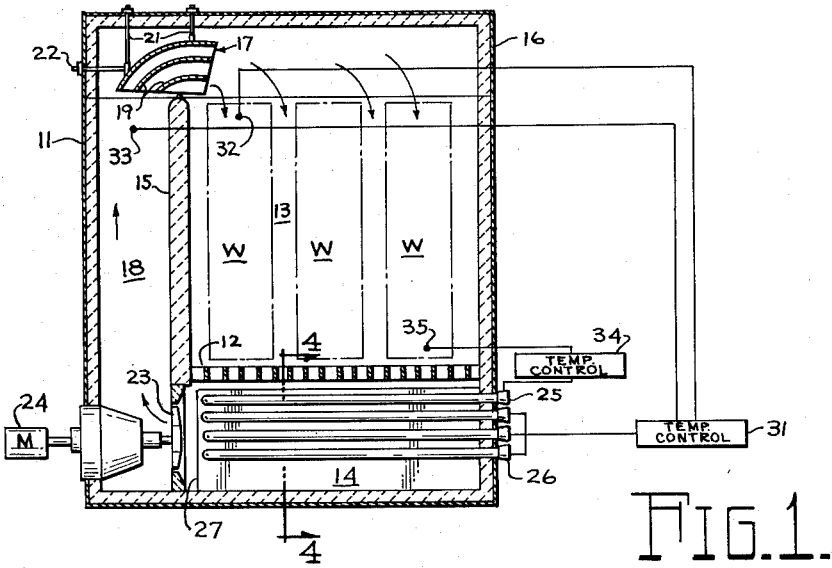
FIG. 1 is an elevational view in section of a preferred embodiment of the invention.

In FIG. 1 the furnace comprises a refractory lined shell 11, a foraminous hearth or support 12 for supporting work and dividing a work heating chamber 13 thereabove from a wind heating chamber 14 therebelow, a bridge wall 15 forming a side of the heating chamber 13 and dividing it from a vertical duct 18 communicating with the heater chamber, and a cover 16 having a recess therein for receiving atmosphere from the vertical duct and distributing the same across the top of the heating chamber. A deflecting unit 17 is disposed above the vertical duct 18 and the bridge wall 15 and by its vanes 19 distributes the atmosphere uniformly to the top or first opening of the chamber 13 for downflow therethrough to the bottom or second opening adjacent the work support 12, which second opening is displaced vertically from the first opening.

The unit 17 is supported by adjustable supports 21, 22 from the cover 16 so that the vanes may be adjusted to the position which gives the desired distribution of atmosphere across the heating chamber.

A recirculating fan impeller 23 is disposed between the vertical duct 18 and the heater chamber 14 and is driven by a motor 24 to provide the desired atmosphere recirculation, it being understood that this motor 24 will be automatically turned off when the cover 16 is raised. With reference to FIG. 1 it will be apparent that the recirculation of the atmosphere will be in the direction shown by the arrows, and that the flow will be in a closed path from the top or first opening of chamber 13 to the bottom or second opening of chamber 13 and thence the atmosphere will be ducted back to the top or first opening via chamber 14, where the atmosphere is heated, duct 18 and unit 17.

In the wind heater chamber 14 banks of internally fired tubes supply heat to the atmosphere circulated therethrough by the fan impeller 23. The top internally fired radiant tubes 25 are exposed through the foraminous hearth 12 to the bottom, or downstream ends of the billets or work W to be heated. Other internally fired tubes 26 forming a first heater are disposed below the top tubes 25 forming a second heater, and are therefore shielded from direct radiation to the billets W, passing substantially all their released heat to the circulating atmosphere.

Figure 4:
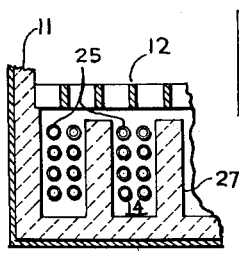
FIG. 4 is a cross-sectional view of a portion of FIG. 1 on line 4—4.

As is best shown in FIG. 4, the tubes 25, 26 are separated by vertical reradiating walls 27, which may be of refractory brick material.

The control system comprises a first, or convection, temperature control instrument 31 controlling the firing rate of the radiant tubes 26 responsive to a thermocouple 32 responding to the temperature of the top of the billets, and also responsive to a second, or recirculating vertical duct thermocouple 33 to reduce the firing rate when the recirculating atmosphere approaches or exceeds a desirable maximum.

A second, or radiation, temperature control instrument 34 controls the firing rate of the upper radiant tubes 25 responsive to a thermocouple 35 responding to the temperature of the bottom of the billets to reduce the firing rate in the upper radiant tubes 25 as the lower end billet temperature approaches or exceeds a desired maximum. Hence, it will be apparent that the heat input from the first heater formed by heating tubes 26 is controlled and regulated independently of the second heater formed by heating tubes 25.

Temperature control instruments 31 and 34 are conventional control devices adapted to control the operation of valve means (not shown) which are associated with, respectively, radiant tubes 25 and 26, and which are adapted to regulate the input of fuel thereto. The operation of the aforesaid valve means is regulated by a control signal, generally electronic or pneumatic, which is transmitted thereto by the respective temperature control instrument. The respective valve means may be controlled either on a two position basis or on a proportional basis, the latter basis being the preferred basis. In the preferred basis the control signal transmitted by temperature control instrument 34 to the valve means associated with radiant tubes 25 is proportional to the difference between the temperature indicated by thermocouple 35 and a pre-selected or set point temperature. Likewise, the control signal transmitted by temperature control instrument 31 to the valve means associated with radiant tubes 26 is proportional to the temperature difference between the temperature indicated by thermocouple 32 and a pre-selected or set point temperature. In addition, temperature control instrument 31 is capable of transmitting a closing signal to the valve means associated with radiant tubes 26 when the temperature indicated by thermocouple 33 approaches or exceeds a safe maximum value.

Figure 2:
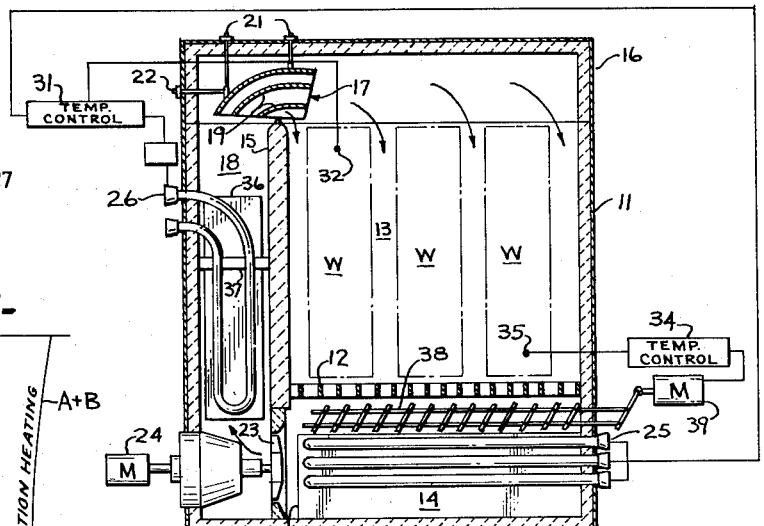
FIG. 2 is an elevational view in section of an alternate embodiment of the invention.

The furnace illustrated in FIG. 2 is a variation of that of FIG. 1 in that the radiant tubes 26 for supplying heat primarily to the recirculating, convection heating atmosphere are disposed in the vertical duct 18 with heat reradiating walls 36 disposed between the tubes and supported in the duct by a support 37; the other radiant tubes 25 which radiate some heat directly to the bottoms of the billets are disposed below the hearth 12, but in this case are also subject to control from the convection control instrument 31; and an adjustable shutter 38, controlled by a motor 39, is disposed between the hearth 12 and the radiant tubes 25 to adjust and limit the direct radiation from the tubes 25 to the bottoms of the billets W.

Since the atmosphere passes over the radiant tubes 25, they transfer considerable heat to the recirculating atmosphere, which in turn reduces their outside wall temperature and thus limits the temperature of the tube from which heat radiates to the work bottom ends. By careful design for a given furnace charge, an optimum radiant heat input to the billet bottoms can be attained, and a predetermined setting of the shutter 38 can be made for other loads.

Figure 3:
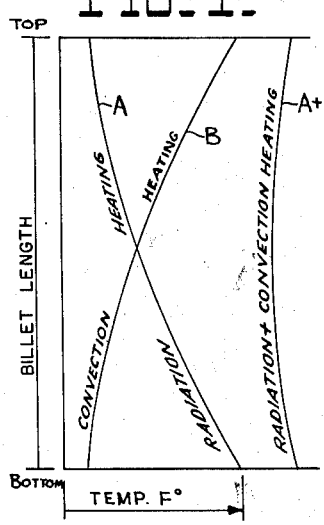
FIG. 3 is a temperature distribution chart showing the temperature distribution along the length of a billet heated in accordance with the invention.

As is illustrated in FIG. 3, the heat transferred to a billet by convection heat transfer alone by the furnaces of FIGS. 1 and 2 produce a work temperature distribution such as shown by curve B along the length 1 of a billet. Heat transfer by radiation alone would produce a curve such as curve A. By using both convection and radiation heat transfer as described, a curve A and B is produced, where the balance at the ends depends upon the relative balance of convection and radiation heat transfer, and the curve depression at the center is reduced as the effective time at temperature increases or the rate of heating decreases. Thus a balanced billet temperature curve within the desired commercial tolerance can easily be produced.

This application is a continuation of our co-pending application Serial Number 817,901, now forfeited.

We claim:

1. A furnace for heating elongate metal billets to a substantially uniform predetermined temperature comprising in combination: wall means forming a heating chamber for the billets to be heated, said chamber having a first opening and a second opening disposed vertically from said first opening; support means disposed generally horizontally within said chamber and adjacent the bottom thereof for supporting a plurality of billets disposed generally vertically within said chamber; duct means connecting said second opening to said first opening; recirculating means for recirculating atmosphere in a generally closed path vertically through said chamber from said first opening to said second opening and thence back to said first opening through said duct; first heating means in said duct means for supplying heat to said recirculating atmosphere without direct radiation to said billets; a temperature controller comprising a temperature sensing element within said chamber and adjacent said first opening for regulating the heat input from said first heating means in response to the temperature sensed by the sensing means; second heating means adjacent said second opening for radiating heat to said billets; and regulating means for regulating the heat input from said second heating means independently of the heat input from said first heating means.

2. A furnace according to claim 1 wherein said temperature controller further comprises a second temperature sensing element disposed within said duct means and exposed to the recirculating atmosphere for reducing the heat input of the first heating means when the temperature of the recirculating atmosphere in said duct exceeds a predetermined maximum.

3. A furnace for heating elongate metal billets to a substantially uniform predetermined temperature comprising, in combination: wall means forming a heating chamber having a top and a bottom; perforate support means pervious to the flow of gas disposed generally horizontally within said chamber adjacent the bottom thereof for supporting a plurality of billets generally vertically within said chamber; duct means connecting the bottom of said chamber to the top of said chamber; recirculating means for recirculating atmosphere in a generally closed path downwardly through said chamber and thence back to the top of said chamber through said duct; first heating means associated with said furnace and adapted to heat said recirculating atmosphere without substantial direct radiation to the billets; a temperature controller having a temperature sensing element within said chamber adjacent the top for regulating the heat input from said first heating means in response to the temperature sensed by the sensing means; second heating means disposed subjacent said perforate support means for radiating heat to the bottom ends of the billets through said perforate support means; and regulating means for regulating the heat input of said second heating means independently of the input from said first heating means.

4. A furnace according to claim 3 wherein said regulating means comprises a second temperature controller having a second temperature sensing element disposed within said chamber adjacent the bottom for regulating the heat input of said second heating means in response to the temperature sensed by said second temperature sensing device.

5. A furnace for heating elongate metal billets to a substantially uniform predetermined temperature comprising in combination: wall means forming a heating chamber for the billets to be heated, said chamber having a first opening and a second opening disposed vertically from said first opening; support means disposed generally horizontally within said chamber and adjacent the bottom thereof for supporting a plurality of billets disposed generally vertically within said chamber; duct means connecting said second opening to said first opening and forming a generally closed recirculating path with said chamber; recirculating means for recirculating atmosphere through the generally closed path vertically through said chamber from said first opening to said second opening and thence back to said first opening through said duct; first heating means in said duct means for supplying heat to said recirculating atmosphere without direct radiation to said billets; a temperature controller comprising a temperature sensing element within said closed path and adjacent said first opening for regulating the heat input from said first heating means in response to the temperature sensed by the sensing means; second heating means adjacent said second opening for radiating heat to said billets; and regulating means for regulating the rate at which heat is radiated from said second heating means to said billets independently of the rate at which heat is supplied by the first heating means to the recirculating atmosphere.

6. A furnace according to claim 5 wherein the regulating means comprises a second temperature controller having a second temperature sensing element within said closed path at a point adjacent the second opening for automatically regulating the rate at which heat is radiated from the second heating means.

7. A furnace for heating elongate metal billets to a substantially uniform predetermined temperature comprising, in combination: wall means forming a heating chamber having a top and a bottom; perforate support means pervious to the flow of gas disposed generally horizontally within said chamber adjacent the bottom thereof for supporting a plurality of billets generally vertically within said chamber; duct means connecting the bottom of said chamber to the top of said chamber and forming a generally closed recirculating path with said chamber; recirculating means for recirculating atmosphere through the generally closed path downwardly through said chamber and thence back to the top of said chamber through said duct; first heating means associated with said furnace and adapted to heat said recirculating atmosphere without substantial direct radiation to the billets; a temperature controller having a temperature sensing element within said closed path adjacent the top for regulating the heat input from said first heating means in response to the temperature sensed by the sensing means; second heating means disposed subjacent said perforate support means for radiating heat to the bottom ends of the billets through said perforate support means; and regulating means for regulating the rate at which heat is radiated from said second heating means to said billets independently of the rate of heat input from the first heating.

8. A furnace according to claim 7 wherein said regulating means comprises a second temperature controller having a second temperature sensing element disposed within said closed path adjacent the bottom for regulating the rate at which heat is radiated from said second heating means to said billets in response to the temperature sensed by said second temperature sensing element.

No references cited.